United States Patent [19]

Ellis

[11] Patent Number: 4,769,633
[45] Date of Patent: Sep. 6, 1988

[54] HEAD-UP DISPLAYS

[75] Inventor: Stafford M. Ellis, East Preston, England

[73] Assignee: GEC Avionics Limited, England

[21] Appl. No.: 849,757

[22] Filed: Apr. 9, 1986

[30] Foreign Application Priority Data

Apr. 17, 1985 [GB] United Kingdom ................. 8509860

[51] Int. Cl.⁴ ............................................. G02D 27/14
[52] U.S. Cl. ..................................... 340/705; 350/174
[58] Field of Search ................ 340/705, 980; 350/174; 358/250, 104; 250/213 VT

[56] References Cited

U.S. PATENT DOCUMENTS

| 3,503,146 | 3/1970 | Woplin | 350/174 |
| 3,511,465 | 5/1970 | Morion | 350/174 |
| 3,620,601 | 11/1971 | Stoneleigh et al. | 358/250 |
| 3,945,716 | 3/1976 | Kinder | 350/174 |
| 4,048,653 | 9/1977 | Spooner | 340/705 |
| 4,178,074 | 12/1979 | Heller | 350/171 |
| 4,188,090 | 2/1980 | Ellis | 350/174 |
| 4,218,111 | 8/1980 | Withrington et al. | 350/3.72 |
| 4,232,943 | 11/1980 | Rogers | 350/202 |
| 4,364,636 | 12/1982 | Ellis | 350/174 |

FOREIGN PATENT DOCUMENTS 1131293 10/1968 United Kingdom .
2154020 8/1985 United Kingdom .

Primary Examiner—Donald J. Yusko
Assistant Examiner—Alvin Oberley
Attorney, Agent, or Firm—Kirschstein, Kirschstein, Ottinger & Israel

[57] ABSTRACT

A display head for a head-up display system for use in a confined space, such as a high performance aircraft cockpit. The display head has a first part (11, 13, 23, 25) adapted to be mounted on an overhead member and the remainder (15, 21, 28, 29, 31) of the display head is pivotally mounted on the first part so as to enable it to be moved readily between operative and stowed positions. In the stowed position the display head does not obstruct movement of the user's head or present an obstruction on which the user may strike his head.

6 Claims, 2 Drawing Sheets

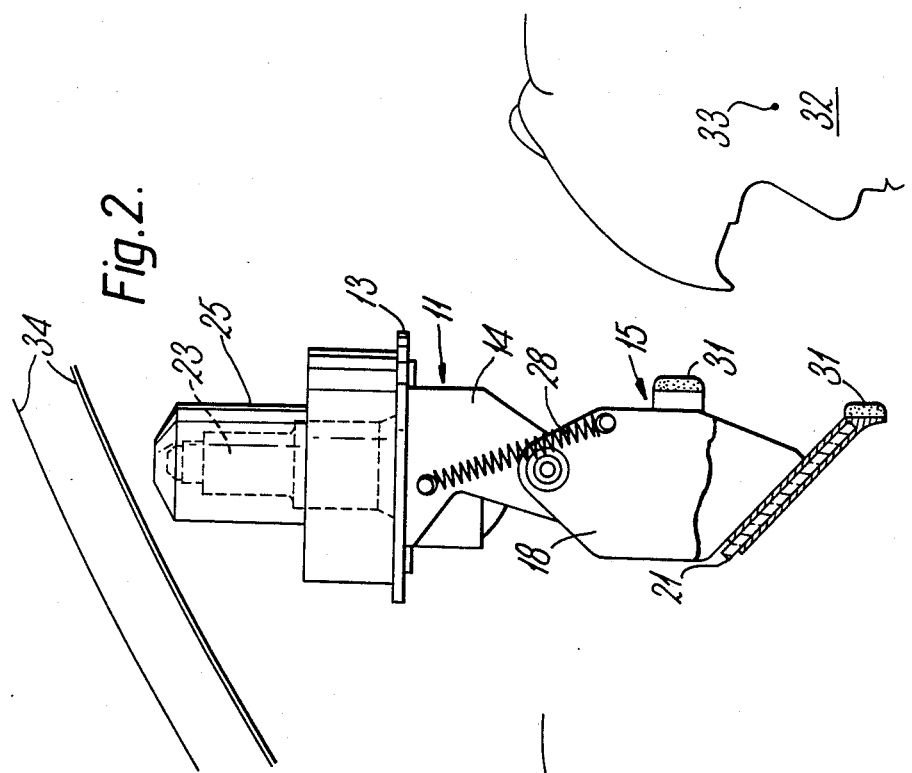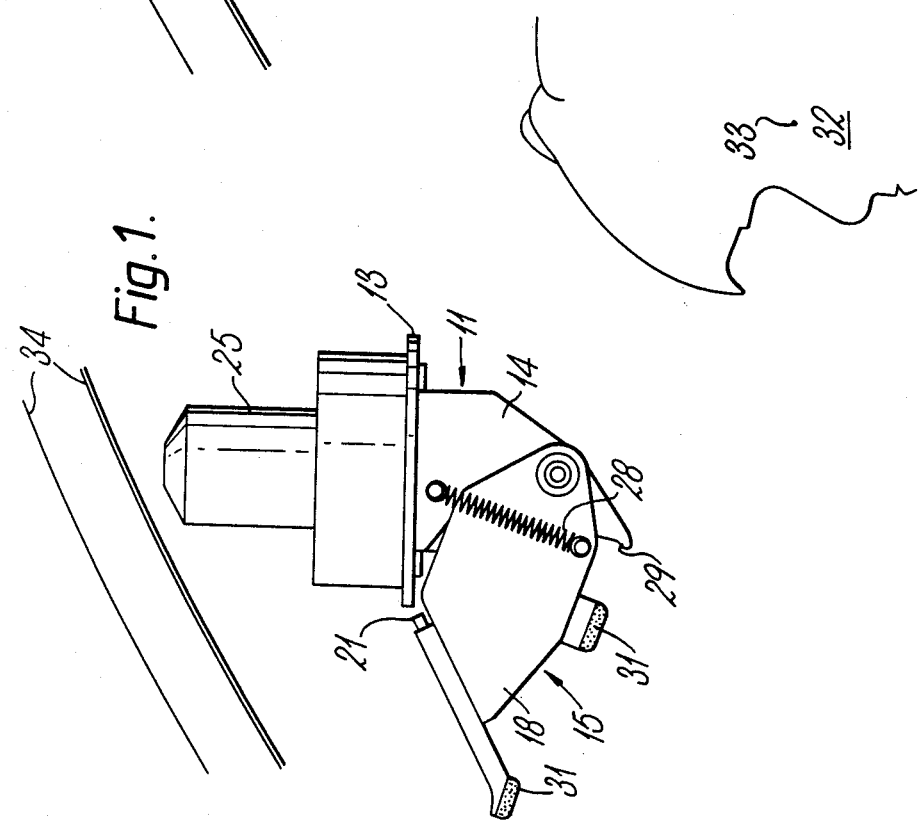

HEAD-UP DISPLAYS

BACKGROUND OF THE INVENTION

1. Field of the Invention

This invention relates to display heads for head-up display systems suitable for use in vehicles, especially aircraft.

More particularly the invention relates to such display heads comprising an optical display source, a collimating optical system and a combiner arranged so that in operation the optical display source projects light representing a display, via the collimating optical system, onto the combiner for reflection thereby to provide an observer with an image of the display superimposed on the view of a distance scene through the combiner.

2. Description of Related Art

When used in a confined space, for example, a high performance aircraft cockpit, there is an ever present possibility of the user's head accidentally striking the display head and/or movement of the user's head being restricted by the presence of the display head.

SUMMARY OF THE INVENTION

It is an object of the present invention to provide a display head which alleviates this problem.

According to the present invention in a display head for a head-up display system comprising an optical display source, a collimating optical system and a combiner arranged so that in operation the optical display source projects light representing a display, via the collimating optical system, onto the combiner for reflection thereby to provide a user with an image of the display superimposed on his view of a distant scene through the combiner, the display head includes first and second frame parts, said collimating optical system comprises spaced apart first and second lens groups carried respectively by said first and second frame parts, said first frame part is adapted to be secured to an overhead member of a vehicle in which said display head is for use and said second frame part is mounted for pivotal movement with respect to said first frame part between a first position in which the display head is stowed and a second position in which the display head is operative for a user whose head is positioned in a predetermined position. Probably said first frame part also carries said optical display source and said second frame part also carries said combiner.

In one particular embodiment of the invention said collimating system having spaced apart first and second lens groups is of the Petzval type.

Preferably the pivotal movement of said second frame part between said first and second positions is against the action of an overcentre spring connected between said first and second frame parts, and contact between abutment surfaces on said first and second frame parts limits movement of the second frame part, thereby to define said second position.

BRIEF DESCRIPTION OF THE DRAWINGS

One display head according to the invention will now be described, by way of example, with reference to the accompanying drawings in which:

FIG. 1 is a diagram showing, in side elevation the display head in a stowed position;

FIG. 2 is a diagram showing, in side elevation, the display head of FIG. 1, in an operative position;

DETAILED DESCRIPTION OF THE PREFERRED EMBODIMENT

Figure 3:
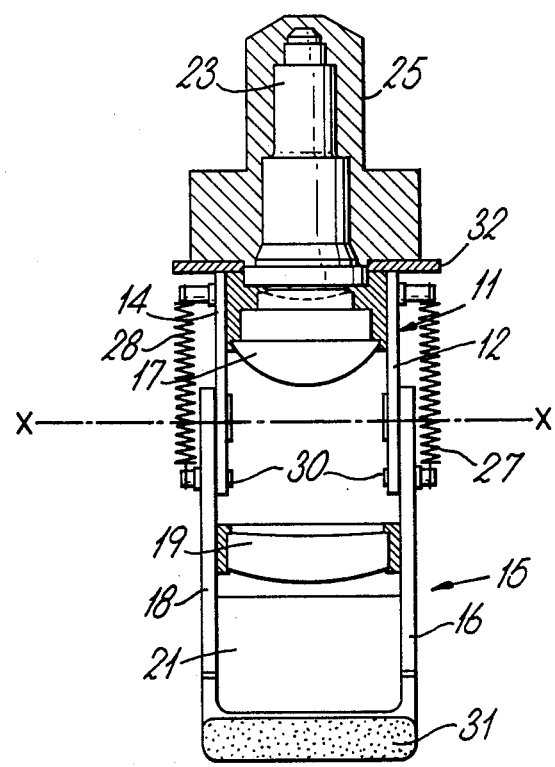
FIG. 3 is a diagram showing, in front elevation, the display head of FIG. 1, in an operative position.

Referring to FIGS. 1, 2 and 3, the display head has a first frame part 11 secured to an overhead member (not shown) of an aircraft cockpit at a mounting flange 13 constituting part of the first frame part 11. A second frame part 15 of the display head is connected to the first frame part 11 for pivotal movement with respect to the first frame part 11 about a transverse hinge axis X—X as shown in FIG. 3.

The first frame part 11 comprises two planar limbs 12, 14 supported between which there is supported one lens group 17 of a Petzval type lens collimating optical system. The second frame part 15 also comprises two planar limbs 16, 18 between which there is supported the other lens group 19 of the Petzval lens system and a combiner 21 of the display head.

The first frame part 11 carries, in addition to the lens group 17, a cathode ray tube 23, which serves as an optical display source for the display head. The cathode ray tube 23 is protected by a housing 25.

Two helical springs 27 and 28, each of which has one end connected to the first frame part 11 and the other to the second frame part 15, are situated on either side of the display head at positions such that they act in unison with an overcentre action in moving the frame part 15 pivotally about an axis X—X between stowed and operative positions shown in FIG. 1 and FIG. 2 respectively.

With the part 15 in the operative position contact is made between abutment surfaces 29 at the ends of the limbs 112, 14 of the frame part 11 and abutment surfaces provided by pins 30 fixed to the insides of the limbs 16, 18 of the frame part 15, the springs 27 and 28 being partly extended in this position so as to hold the abutment surfaces in contact.

The lines 34 on FIGS. 1 and 2 indicate the position of the cockpit canopy in relation to the display head and the pilot's head 32.

In use of the display head, with the frame part 15 in the operative position as shown in FIG. 2, the optical display source 23 projects light representing a display via the Petzval lens type collimating optical system 17, 19, onto the combiner 21 for reflection thereby to provide the pilot with his eyes positioned at a design eye position 33 shown in FIGS. 1 and 2, with an image of the display superimposed on his view of the distant forward scene through the combiner 21.

Figure 4:
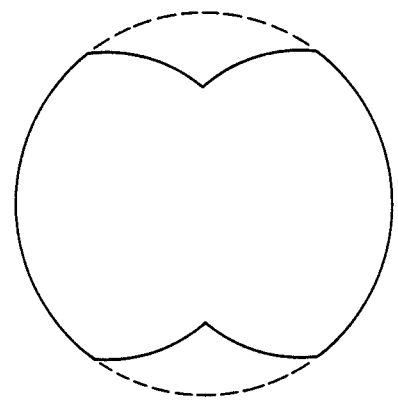
FIG. 4 is a representation of the fields of view available at a design eye position for the display head.

An indication of the field of view available at the position of the design eye 33 is shown in FIG. 4.

When the display provided by the display head is not required the frame part 15 is rotated forwardly into the stowed position shown in FIG. 1 where it does not present an obstruction restricting movement of the pilot's head and which he may accidentally strike with his head.

To provide a safeguard against injury to the pilot's head with the display head in use, the surfaces of the first and second frame parts 11, 15 are provided with energy absorbing pads 31.

I claim:

1. In a vehicle, a display head for a head-up display system comprising: first and second frame parts; a collimating optical system consisting of first and second lens groups carried respectively by said first and second frame parts; an optical display source carried by said first frame part at a fixed position relative to said first lens group; and a combiner carried by said second frame part at a fixed position relative to said second lens group; said first frame part being secured to an overhead member of said vehicle; and said second frame part being mounted on said first frame part for pivotal movement about an axis between a first position in which the display head is stowed so as not to present an obstruction to movement of a user's head from a predetermined position, and a second position in which the display head is operative for a user whose head is positioned at said pre-determined position to cause light projected by said display source representing a display to pass in turn via said first and second lens groups of said collimating optical system onto said combiner for reflection thereby to provide the user with an image of the display superimposed on his view of a distant scene through the combiner.

2. A display head according to claim 1 wherein said collimating optical system consisting of spaced apart first and second lens groups is of the Petzval type.

3. A display head according to claim 1 further comprising an overcentre spring arrangement connected between said first and said second frame parts, and wherein said first and said second frame parts have abutment surfaces which, on movement of said second frame part from said first to said second positions against the action of said overcentre spring arrangement, contact one another to define said second position.

4. A display head according to claim 1 further comprising energy absorbing pads positioned on said first and second frame parts to provide a safeguard against injury to the head of a user.

5. A display head according to claim 1 wherein said axis extends transverse to the direction of a user's view through the combiner.

6. A display head according to claim 5 wherein when in said first position, said second frame part is positioned forward of said first frame part with respect to said predetermined position.

* * * * *